३,२३८,२६२
Patented Mar. 1, 1966

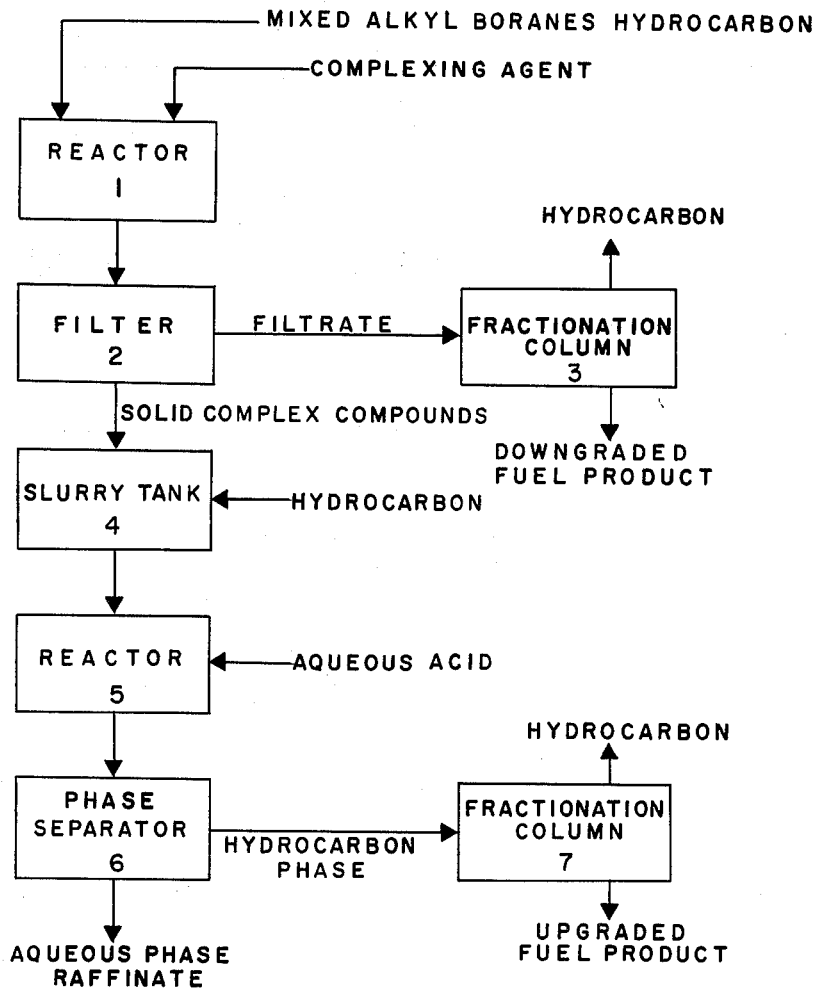
RALPH R. SCHROEDER
PAUL R. WUNZ, JR.   *INVENTOR.*
BY *Donald L. Rose*

3,238,262
METHOD OF SEPARATING MIXTURES OF ALKYL SUBSTITUTED HIGHER BORANES
Ralph R. Schroeder, Pittsburgh, and Paul R. Wunz, Jr., Gibsonia, Pa., assignors to Callery Chemical Company, Pittsburgh, Pa., a corporation of Pennsylvania
Original application Sept. 10, 1958, Ser. No. 760,528. Divided and this application Apr. 20, 1962, Ser. No. 196,020
6 Claims. (Cl. 260—606.5)

This is a division of application Serial No. 760,528, filed September 10, 1958, now abandoned.

This invention relates to a method of separating those components with higher heats of combustion from mixtures of alkylated higher boranes, and more particularly to their separation by complexing the components with ammonia or an amine and recovering the components from the complex.

There is considerable interest in the lower alkyl derivatives of the higher boranes as these compounds are especially suited for use as high energy fuels because of their high heat of combustion and desirable physical properties, e.g. low vapor pressure, wide liquidous range, and relatively high spontaneous ignition temperature. The alkyl derivatives of higher boranes have been prepared by several methods such as, for example, alkylation of higher boranes described in Wunz and Stang, Serial Number 484,586, filed January 27, 1955 now abandoned, and in Schechter and Wunz, Serial Number 584,409, filed May 7,1956, now abandoned; and by reactions of alkenes and diborane as described in Eads and Brandt, Serial Number 546,817, filed November 14, 1955, now U.S. Pat. No. 3,057,924, issued October 9, 1962, all of common ownership with this application. The methods of making alkyl substituted higher boranes, however, produce mixtures of compounds with different degrees of alkyl substitution. Since the element boron has a heat of combustion much higher than carbon, those compounds with a higher ratio of boron to carbon have a higher heat of combustion and hence deliver more energy per unit weight when used as fuels; i.e., those compounds with fewer alkyl substituents have a higher heat of combustion than those with more alkyl substituents. For example, monoethyldecaborane has an approximate heat of combustion of 26,400 B.t.u. per pound and diethyldecaborane has an approximate heat of combustion of 24,600 B.t.u. per pound. It is desirable to recover those components which deliver the most energy per unit weight when used as fuels.

It is an object of this invention to provide a method of separating those components which have the highest heat of combustion from mixtures of lower alkyl substituted higher boranes. It is a more specific objective to accomplish this separation by treating the alkylated borane mixtures with ammonia or an amine to form a complex with the most desirable fuel components, and to recover the fuel components from the complex. Other objects will become apparent from the description and claims hereafter related.

This invention is based on the discovery that ammonia and amines form complexes with alkyl substituted higher boranes and that the reaction to form the complexes proceeds more readily with boranes with fewer substituted alkyl groups. When ammonia or an amine is contacted with a mixture of alkylated higher boranes, the complexed product contains a higher proportion of less alkylated boranes than the original mixture. These complexes can be easily separated from uncomplexed alkylated higher boranes because of different solubility characteristics, and the alkylated boranes can be regenerated from the complexes by treatment with a non-oxidizing acid.

Hereinafter the fuel product containing a higher ratio of boron to carbon than the original mixture is designated as upgraded; that with a lower ratio of boron to carbon is designated as downgraded.

The drawing shows a schematic diagram of a preferred process for separating the alkylated higher boranes. A solution of the alkylated higher boranes in a hydrocarbon solvent is contacted with the complexing agent in reactor 1 forming a complex which is insoluble in the hydrocarbon solution. The complexing agent may be added as a mixture or solution in a hydrocarbon or water solvent, although it is preferred to add the pure complexing agent. The reaction proceeds readily at any temperature at which the complex is stable, but it is preferred to carry out the reaction at ambient temperatures as the expense of heating or cooling is avoided. The slurry product from reactor 1 is separated by filter 2. Any separating means, such as centrifugation or thickening, may be used as well as conventional filtration. The filtrate, a hydrocarbon solution of the more highly alkylated boranes is fractionated in column 3. The hydrocarbon is removed overhead for reuse in the process. The downgraded fuel bottoms product from column 3 may be used directly as a fuel, or it may be recycled for further treatment with diborane for upgrading and then be recycled through the separating process. The complexed alkylated higher boranes remain as a residue on filter 2 and are reslurried in hydrocarbon in slurry tank 4. It is also possible to dissolve the complex in water and regenerate the alkylated boranes from this solution; this is not preferred, however, as the complexes are slowly hydrolyzed by water and losses of product thus incurred are eliminated by use of a hydrocarbon.

The slurry of complexed alkyl boranes in hydrocarbon is then contacted in reactor 5 with an aqueous solution of a non-oxidizing acid to regenerate the alkyl borane from the complex. The reaction products are divided between two liquid phases in this reactor: the hydrocarbon phase contains the regenerated alkyl borane and the aqueous phase contains the salt formed by reaction of the acid and the complexing agent. It is believed that the regeneration reaction occurs primarily in the aqueous phase, the phase in which both reactants are soluble, and the produced alkyl borane are then extracted into the hydrocarbon phase. It is desirable therefore to use a mixed hydrocarbon and water solvent for this operation. If only water solvent is used there are losses of product by hydrolysis; although the alkylated higher boranes are only very slightly soluble in water the solubility is sufficient to permit a slow hydrolysis reaction. If only a hydrocarbon solvent is used the regeneration reaction is very slow; it is believed this is due to surface coating effects. That is, as the acid reacts with the insoluble complex an insoluble salt is formed coating the complex preventing further reaction. Thus the use of the mixed reaction solvent provides a phase in which the reaction occurs, and the distribution constant between the phases is such that the product is rapidly removed to the hydrocarbon phase and hydrolysis losses are minimized. The reaction proceeds readily over a wide temperature range, although it is preferred to operate at or below ambient temperature, because at elevated temperatures the hydrolysis losses are increased. An equivalent of acid is required for each equivalent of complexing agent for complete reaction, but the presence of even substantial excesses of acid is not detrimental. Reactor 5 may be a stirred pot or any other apparatus suitable for contacting two liquid phases, e.g., counter-current contactors. The products from reactor 5 are fed to separator 6 where the heavier aqueous phase, containing the neutralized complexing agent, is discharged as raffinate and the hydrocarbon phase is removed and fed to fractionation column 7 where the hydrocarbon is separated from the upgraded fuel product.

It has been found that any of the saturated hydrocarbons, such as n-hexane, diisopropyl and pentane, as well as industrial hydrocarbon mixtures, such as petroleum ether or kerosene, are satisfactory solvents. It is preferred to use a solvent that boils at or below about 90° C. to facilitate separation from the alkylated boranes. The complex compounds are essentially insoluble in alkylated higher boranes so the use of a solvent is not necessary to prepare and separate the complex compounds. The use of a solvent is preferred as it facilitates mechanical performance of the reaction by reducing the solid concentration of the product slurry. Ammonia, amines, and water or hydrocarbon solutions thereof have been found to be effective complexing agents. Non-oxidizing acids such as hydrogen halides, e.g. HCl, and boron trihalides are effective to regenerate the alkylated borane from the complexes.

The manner of carrying out the individual operations in this process is set forth in greater detail in the following examples. In one reaction, 5 ml. of concentrated ammonium hydroxide was added to a solution of about ten grams of mixed ethyldecaboranes (boron content 55.5% and carbon content 31.4%) in 100 milliliters of diisopropyl. There was an immediate reaction forming a sludge from which the diisopropyl phase was decanted. The downgraded fuel separated by distillation from this diisopropyl solution contained 49.5% boron and 38.9% carbon. The sludge was then contacted, in a flask equipped with a slow speed agitator, with a mixture of 100 milliliters of diisopropyl and 100 milliliters of dilute hydrochloric acid. The diisopropyl phase was decanted from the aqueous phase and was separated by distillation. The bottoms product from this distillation was an upgraded ethyldecaborane which contained 63.1% boron and 26.2% carbon. In another reaction carried out in the same manner, but using anhydrous ethylenediamine as a complexing agent, the upgraded ethyldecaboranes contained 66.5% boron and 22.6% carbon, and the downgraded fraction contained 52.3% boron and 26.6% carbon.

In another reaction a solution of ethyldecaboranes (57% boron, 25.2% carbon) and 100 milliliters of diisopropyl was threated with 100 milliliters of 3% ammonium hydroxide, which produced a solution of uncomplexed ethyldecaboranes in diisopropyl and a solution of ethyldecaborane complex in the aqueous phase. The aqueous phase was separated and treated with 100 milliliters of 10% hydrochloric acid and this solution was then contacted with diisopropyl which extracted the regenerated ethyldecaboranes. The diisopropyl solution was separated by distillation giving a residue of alkyl decaboranes containing 65.7% boron and 17.9% carbon.

A pentane solution of a mixture of ethylated higher boron hydrides prepared by the method of Eads et al., Ser. No. 546,817, which was shown by infra-red spectrum analysis to contain alkylated decaboranes, pentaboranes, and tetraboranes and had a boron content of 45% and a carbon content of 37.5% (boron to carbon mole ratio of 1.33 to 1), was treated with anhydrous ammonia in the same manner as in the above experiment. A precipitate was formed on the treatment with ammonia which was separated by filtration. Pentane was distilled from the filtrate and the downgraded product contained a boron to carbon mole ratio of 1.2 to 1. The upgraded product recovered by acidification of the complex as in the previous experiment had a boron to carbon ratio of 1.85 to 1. A total of 92% of the boron charged was recovered in the two products.

The ammonia complexes with alkyl boranes can also be thermally decomposed to recover the alkyl borane, in contrast to the amine complexes which are quite stable. Thus when 7 grams of mixed ethyldecaboranes (55.5% boron, 30.9% carbon) was charged to a closed reaction vessel and anhydrous ammonia was injected into the ethyldecaborane solution and a precipitate was formed immediately. This precipitate was separated by filtration and charged into a reactor where it was thermally decomposed. This reactor consisted essentially of a glass flask heated by an oil bath, which discharged through a vertical tube into a condenser which was connected through a vacuum pump to a vent. The system was evacuated to about 5 mm. Hg pressure and the oil bath was brought to a temperature of 80 to 90° C. Ammonia was discharged through the vacuum pump to the atmosphere. A liquid distillate, 2.4 grams, was recovered which was predominately monoethyldecaborane (67.6% boron and 23.1% carbon).

It has been shown that alkyl amines, aryl amines, mixed alkyl aryl amines and cyclic amines form complexes with alkylated higher boranes and the reaction proceeds more readily with boranes with fewer alkyl substituents. The results of reactions using several typical amines as complexing agents is set forth in Table I.

TABLE I

*Separation of alkylated higher boranes by treatment with amines*
[Charge 5 g. alkylboranes in 25 ml. hexane, B/C ratio 1.48]

| Amine | Amount of Amine (ml.) | B/C ratio in complexed alkyl-boranes | B/C ratio in uncomplexed alkyl-boranes | Percent Boron recovered |
|---|---|---|---|---|
| $\phi$NH | 2 | 1.91 | 1.38 | 91 |
| $\phi$NHCH$_3$ | 2 | 2.02 | 1.17 | 92 |
| $\phi$N(CH$_3$)$_2$ | 2 | 2.24 | 1.35 | 71 |
| (C$_2$H$_5$)$_3$N | 2 | 1.81 | 0.91 | 90 |
| (C$_4$H$_9$)$_3$N | 3 | 2.14 | 1.13 | 97 |

The amount of alkyl boranes complexed increases if a higher proportion of amines is used. Thus it is possible with the use of larger amounts of amine to complex a greater proportion of the alkyl borane mixture and obtain a fuel which is moderately upgraded. For example when 5 grams of alkylated boranes (B/C ratio 1.48) was contacted with 2 ml. of triethylamine, as in the previous experiments the boron to carbon ratio in the complex was 1.181 and 3.5 grams of complex were recovered. However, when 5 grams of the alkylated boranes were contacted with 3 ml. of triethylamine, the boron to carbon ratio in the complex was only 1.6, and 6.3 grams of the complex was recovered.

The liquid alkyl substituted higher boranes which are produced by the above reactions are useful as high energy fuels in bipropellant systems. These liquid high energy fuels burn readily with conventional oxidizers, including air and oxygen, and are primarily useful in turbojet, ram jet, and rocket engines. These fuels may be used alone or in mixtures with other fuels toward which they are chemically inert, e.g. most ordinary hydrocarbon fuels. These fuels have a high heat of combustion (greater by 20–50% than the best hydrocarbon fuels), are spontaneously inflammable in air at high temperatures (in excess of 250–300° F.), and have other desirable fuel properties, e.g. large liquids, range, low viscosity, stability against thermal decomposition and moderately resistant to hydrolysis. In actual tests the fuel produced by the above process is used as follows: A sample of the fuel is introduced into the combustion section of a jet test engine, burned with compressed air, and the efficiency of the combustion and output of the engine measured. When this fuel was burned in a test engine it was found to have a heat of combustion more than 20% greater than the best hydrocarbon fuels. The combustion efficiency of this fuel was equal to JP–4 (a standard jet fuel in use for several years past) and the thrust of the engine per unit weight of fuel was substantially greater than the thrust obtained using the best hydrocarbon fuels. In comparative tests on the fuel produced by the above process and other boron-containing high energy fuels and other hydrocarbon fuels it has been found that engine output is directly proportional to the heat of combustion per unit weight of fuel. Thus, an aircraft using a high energy boron-containing fuel can travel proportionately further with the same load or can carry proportionately greater loads than when fueled with conventional fuels.

While there have been described several embodiments of this invention it is to be understood that within the scope of the claims this invention may be practiced otherwise than as specifically described.

Having thus described this invention and the manner in which it is to be performed, what we desire to claim and secure by Letters Patent of the United States is:

1. A method of separating those components with a higher heat of combustion from a mixture of lower alkyl substituted higher boranes selected from the group consisting of lower alkyl substituted tetraboranes, lower alkyl substituted pentaboranes, lower alkyl substituted decaboranes, and mixtures thereof which comprises contacting said mixture with a sufficient quantity of a complexing agent to complex with those lower alkyl substituted higher boranes having a higher heat of combustion, said complexing agent being selected from the group consisting of ammonia, alkali amines, aryl amines, and mixed alkyl aryl amines, separating the alkyl substituted higher borane complex compound from the uncomplexed alkyl substituted higher boranes, regenerating the alkyl substituted higher boranes from the complex by treatment with a non-oxidizing acid, and recovering the regenerated alkyl substituted higher boranes.

2. A method according to claim 1 in which the non-oxidizing acid is a hydrogen halide.

3. A method according to claim 1 in which the mixture of lower alkyl substituted higher boranes is a mixture of ethyldecarboranes.

4. A method according to claim 1 in which the complex forming reaction is performed in a hydrocarbon solvent, and the regeneration reaction is performed in a mixed water and hydrocarbon solvent.

5. A method according to claim 4 in which the hydrocarbon solvent has a boiling point below about 90° C.

6. A method of separating those components with a higher heat of combustion from a mixture of lower alkyl substituted decaboranes which comprises contacting at room temperature said mixture in a hydrocarbon solvent which has a boiling point below about 90° C. with a sufficient quantity of a complexing agent to complex with those lower alkyl substituted decaboranes having a higher heat of combustion, said complexing agent being selected from the group consisting of ammonia, alkyl amines, aryl amines, and mixed alkyl aryl amines, separating the resulting hydrocarbon solution of uncomplexed lower alkyl substituted decaboranes from the solid complexed lower alkyl substituted decaboranes, recovering the uncomplexed lower alkyl substituted decaboranes from said solution by distillation, slurrying said solid complex in a hydrocarbon solvent which has a boiling point below about 90° C., contacting said slurry at a temperature not exceeding room temperature with an aqueous solution of a non-oxidizing acid, separating the resulting hydrocarbon solution of lower alkyl substituted decarboranes, and recovering said lower alkyl substituted decaboranes from said solution by distillation of said hydrocarbon.

References Cited by the Examiner

UNITED STATES PATENTS 3,037,846   6/1962   Mann et al. _____ 260—247

SAMUEL H. BLECH, *Primary Examiner.*

LEON D. ROSDOL, TOBIAS E. LEVOW, *Examiners.*